Patented May 20, 1930

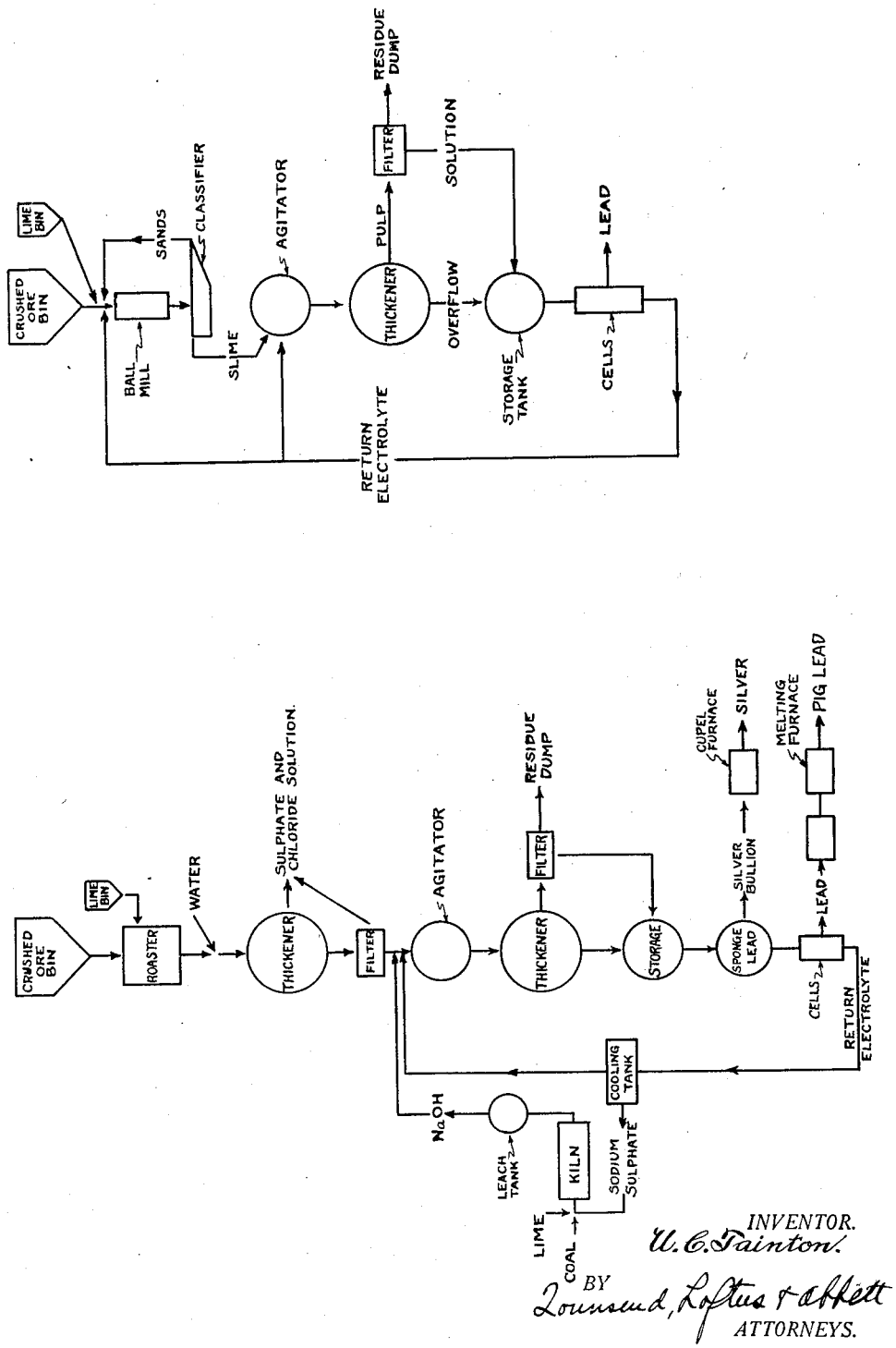

1,759,494

UNITED STATES PATENT OFFICE

URLYN C. TAINTON, OF JOHANNESBURG, TRANSVAAL, SOUTH AFRICA

METHOD FOR THE RECOVERY OF LEAD AND OTHER METALS FROM ORES OR OTHER LEAD-BEARING MATERIALS

Application filed September 19, 1927. Serial No. 220,358.

This invention relates to an improved method for the recovery of lead and other metals from ores or other lead bearing materials.

According to this invention, if the lead is present as sulphide, the ore is first ground and then roasted; oxidized ores are treated direct. If roasting is employed, it is often advantageous to allow the roaster gases to travel through the furnace in the same direction as the ore and to have a small quantity of common salt, sodium chloride, present in the ore during roasting as this tends to increase the efficiency of the subsequent extraction.

The lead after roasting is largely in the form of oxide and sulphate. It is sometimes desirable after roasting to leach the ore first with water to remove soluble salts such as zinc and manganese sulphates; this washwater may be subsequently treated for the recovery of its values.

In the case of oxidized ores, the lead is usually already present as carbonate, sulphate, oxide, etc., so that preliminary roasting and washing is unnecessary. The ground ore is then leached with the solution returning from the electrolytic cells, as will hereinafter be described. I find it advantageous in many cases to grind the ore in a ball mill or equivalent machine using the solution itself to make a pulp.

The active constituent of the leaching solution consists primarily of hydroxides of alkali metals such as sodium hydroxide. Other constituents are present as will be described later. The lead goes into solution as sodium plumbite.

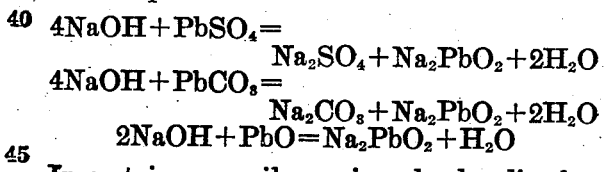

In certain cases, silver minerals also dissolve in the solution but in other cases it may be necessary to use an addition agent to promote the solution of silver if this is present. Such addition agents consist of cyanogen compounds such as cyanide, or ammonium salts, thiosulphates, hyposulphites, etc.

The ore after being agitated or leached with the solution is separated from the residue according to known methods of settlement and filtration. The solution containing the lead together with silver, gold and other metals may be precipitated direct so that all the metals are recovered together, or it may be given a preliminary treatment to separate silver, gold and other metals from the lead. This treatment may take the form of precipitation with metallic lead, or with sulphuretted hydrogen, zinc, or barium sulphide in limited amounts. Alternatively the solution may be subjected to selective electrolysis so that the metals electro-positive to lead are precipitated but most of the lead remains in solution.

The solution is then electrolyzed for recovery of its contained lead under conditions such that a soft spongy deposit of lead is formed. This may be done in electrolytic cells of the type described in prior patents of the present applicant (see as an example Pat. No. 1,334,419). The deposited lead after detachment from the cathode may be briquetted and melted or converted into lead oxides or other compounds by known means.

It will be seen from the foregoing chemical equations that the lead in going into solution gives rise to other sodium salts such as carbonate or sulphate. I have found that if these are allowed to accumulate beyond a certain point, trouble arises owing to a reduction in the activity of the solution. According to the present invention this may be prevented by causing the acid radical to combine with an alkaline earth, usually in oxide form. For example in leaching a carbonate ore, milk of lime may be added to the pulp in amount sufficient to combine with all carbonate present

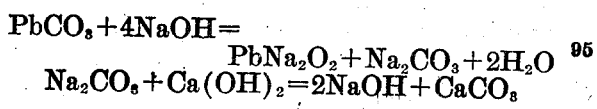

The sodium hydroxide is thus regenerated and the insoluble calcium carbonate goes out with the residues.

Similarly in the case of lead sulphate, barium salts may be used $$Na_2SO_4 + Ba(OH)_2 = BaSO_4 + 2NaOH$$

If desired this precipitation may be carried out in a separate circuit, the barium sulphate being either recovered for use or sale as blanc fixe or converted back to barium hydroxide by known means.

Alternatively sulphate may be separated by refrigerating the solution when sodium sulphate will separate out in the form of crystals. This may then be converted back to caustic soda by known methods as in the Le Blanc soda process, or by electrolysis. By using a diaphragm in the primary electrolysis, part of the solution may be circulated through the anode chambers until the sulphate concentration reaches a relatively high value and this solution may then be made to react with lime as before, giving insoluble calcium sulphate, and so eliminating the sulphate from solution. If a diaphragm of low porosity is used, the anolyte may be kept confined until it becomes acid and the sodium ions are depleted to a low point. This sulphuric acid solution may then be withdrawn from the circuit and the accumulation of sulphate thereby prevented.

As an example of the application of the process, I will describe the treatment of a carbonate and sulphide lead ore respectively. In the case of carbonate ore, the flow sheet may be as shown in Fig. 1. The ore is first crushed and then fed to a ball mill where it meets a stream of return electrolyte and is ground as a pulp. This solution contains, for example 2-5% of sodium hydroxide and 0.1% sodium cyanide. The pulp leaving the mill goes to a classifier, the sands being returned for regrinding and the slime portion overflowing to an agitator. In the agitator, enough more solution is added to make a solution containing about 0.25 to 1.0% of lead. At some suitable point in the circuit, lime is added in sufficient amount to convert any carbonate present to calcium carbonate; if desired, the lime may be added to the ball mill. The pulp after agitation flows to a thickener where the supernatant solution is decanted off while the thick pulp flows to a filter, where the solids are separated and washed with water before discharging. The solution from the filter joins that from the thickener overflow and goes to a storage tank whence it flows to the requisite number of electrolytic cells in which the lead is precipitated. The conditions in these cells are so adjusted that the lead comes down in loose spongy form, and is detached and removed for melting up in ingot form. Part of the precipitated solution may be circulated through the anode chambers before being returned to the leaching circuit as before mentioned.

The treatment of a sulphide ore is illustrated in Fig. 2. Here the ore is ground and then roasted, a chloride being added to the roast if found desirable. The calcine is washed with water to remove soluble salts and then agitated with a solution containing alkaline hydroxides of the same composition as above. The solution is then separated from the ore and is brought into intimate contact by agitation or percolation with sponge lead returned from the cells. This precipitates silver, gold and the other metals below lead on the electrochemical scale. The solution is then electrolyzed under conditions described in my co-pending application using chrome steel cathodes, and lead, iron or nickel anodes. The lead after detachment from the cathodes is pressed or washed to free it from entrained solution and then melted. Or if desired, it may be converted directly to lead compounds such as oxides. To prevent the sulphate in the solution from reaching too high a point, a part of the solution may be subjected to cooling either natural or artificial and the sodium sulphate deposited. This may then be converted back to caustic soda by heating with lime and coal. Alternatively, the sulphate may be made to react with barium or calcium hydroxides, as previously described and so removed from solution.

As compared with previous suggested methods of recovering lead, this process presents the following advantages;

(1). Solutions are non-corrosive to iron and most other metals, so plant may be built of cheap materials.

(2). Pulp in this solution settles and filters very rapidly. This allows a high capacity from a given size plant;

(3). No other metals tend to dissolve and accumulate in the solutions;

(4). Current efficiency in electrolysis is high, cell voltage low, and power consumption per unit of metal therefore small;

(5). Ordinary metal anodes are permenent in the solutions and cellulose diaphragms may also be used;

(6). For many ores the only chemical supplies required consists of lime which is usually abundant near lead deposits.

Having thus described my invention, what I claim and desire to secure by Letters Patent is:—

1. A method of recovering metallic lead from material containing carbonate or sulphate salts thereof, which consists in treating the material after grinding with a solution containing alkaline hydroxides to dissolve the lead as an alkali plumbite, separating the solution from the residue, electrolyzing said solution to precipitate metallic lead, removing the sulphate or carbonate radical from the solution, and employing the solution for leaching a fresh charge of material.

2. A method of recovering metallic lead from material containing carbonate or sulphate salts thereof, which consists in treating the material after grinding with a solution containing alkaline hydroxides to dissolve the lead as an alkali plumbite, separating the solution from the residue, electrolyzing said solution to precipitate metallic lead, regenerating the alkaline hydroxides by adding oxides of the alkaline earths to the solution so as to precipitate the sulphate or carbonate contained as insoluble carbonate or sulphate, and employing the regenerated solution for leaching a fresh charge of material.

3. A method of recovering metallic lead and silver from material containing carbonate or sulphate salts thereof, which consists in treating the material after grinding with a solution containing alkaline hydroxides and an addition agent capable of dissolving silver to dissolve the silver, and the lead as an alkali plumbite, separating the solution from the residue, and precipitating the silver and lead from the solution.

4. A method of recovering metallic lead and silver from material containing carbonate or sulphate salts thereof, which consists in treating the material after grinding with a solution containing alkaline hydroxides and an addition agent capable of dissolving silver to dissolve the silver, and the lead as an alkali plumbite, separating the solution from the residue, precipitating the silver from the solution, electrolyzing the solution to precipitate metallic lead, removing the sulphate or carbonate radical from the solution, and employing the solution for leaching a fresh charge of material.

URLYN C. TAINTON.